April 16, 1929.  W. J. MANTHEI  1,709,030
HANDLE CONSTRUCTION
Filed April 12, 1928
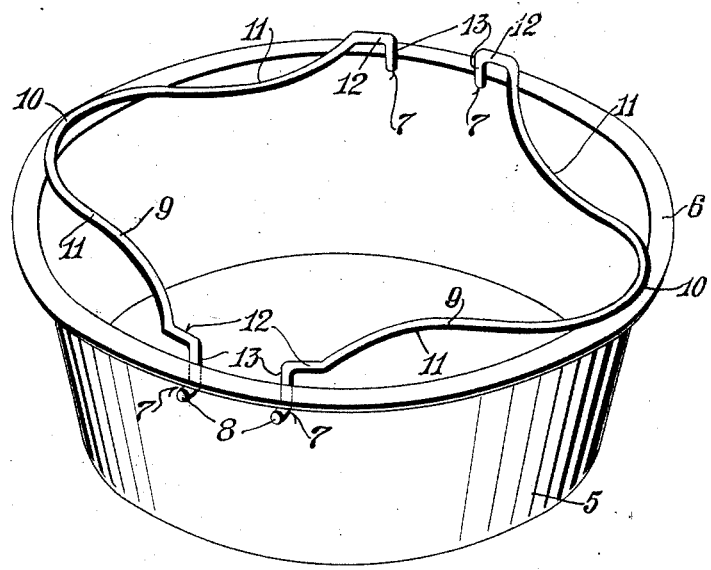
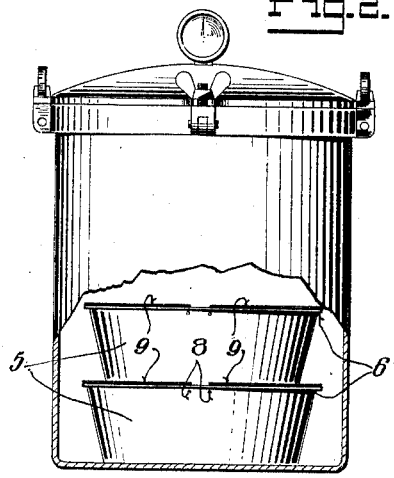
Inventor
Walter J. Manthei
By Ira Milton Jones.
Attorney Patented Apr. 16, 1929.

1,709,030

UNITED STATES PATENT OFFICE.

WALTER J. MANTHEI, OF MILWAUKEE, WISCONSIN.

HANDLE CONSTRUCTION.

Application filed April 12, 1928. Serial No. 269,372.

This invention relates to certain new and useful improvements in handle constructions for pans and other utensils adapted to be arranged in stacked relation, and has as an object the provision of an improved handle which, when in horizontal position, provides a support for receiving another pan and which may be readily swung to a vertical position to afford convenient means for lifting the pan or utensil.

Another object of this invention resides in the provision of an improved handle construction for pans and other utensils consisting of a pair of complementary members pivoted to the pan at opposite sides of a line intersecting its axis with the bight of the members engaging the rim of the pan or utensil when in horizontal position.

And a further object of this invention resides in the provision of an improved handle construction for pans and other utensils which provides means for supporting another pan or utensil whereby pans or utensils so equipped may be arranged in stacked relation and in which the handle members are readily removable to permit the pans or utensils to be nested one within the other.

With the above and other objects in view which will appear as the description proceeds, my invention resides in the novel construction, combination and arrangement of parts substantially as hereinafter described and more particularly defined by the appended claims, it being understood that such changes in the precise embodiment of the herein-disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a perspective view of a pan or utensil equipped with my improved handle; and Figure 2 is a view of a pressure cooker illustrating the manner of stacking pans or utensils equipped with my improved handle, the cooker member having a portion broken away.

Referring now more particularly to the accompanying drawing, in which like numerals designate like parts throughout the several views, 5 represents a pan or utensil having a peripheral rim or flange 6 and having two pairs of diametrically opposed apertures 7 in which the laterally turned ends or trunnions 8 and a pair of complementary handle members 9 are pivotally and removably engaged. The handle members, which are identical in construction are approximately V-shape as illustrated in Figure 1, with the apexes of the V curved as at 10, and the sides curved inwardly and outwardly, as at 11, the ends being directed outwardly, as at 12, downwardly as at 13 and then laterally to form the trunnions 8. The adjacent apertures 7, in which the trunnions 8 are engaged, are spaced apart and the apexes or closed ends 10 of the handle members rest on the rim or flange 6 when in horizontal position and the vertical portions 13 are of sufficient height to cause the handle members to assume a position parallel with the top of the pan so that a second pan placed thereover will be supported entirely by the handle members.

To remove the handle members to permit the pans to be nested one with another, it is only necessary to grasp the portions 11 of the handles and force the ends thereof together until the trunnions 8 are removed from their apertures.

From the foregoing description, taken in connection with the accompanying drawing, it will be readily apparent to those skilled in the art to which an invention of the character described appertains, that I provide a novel and improved handle for pans and utensils whereby a series of pans may be readily stacked one above the other or may be carried by the handle and whereby removal of the handle permits the nesting of the pans.

What I claim as my invention is:

1. In a utensil, a pair of handles pivotally connected with the utensil and of approximately V-shape with their apexes resting on the rim of the utensil when in horizontal position whereby the sides of the handles provide a support for a second utensil the bottom of which is of less diameter than the top of the first utensil.

2. In a utensil, a pair of handle members pivotally connected with the utensil and of approximately V-shape with their apexes resting on the rim of the utensil when in horizontal position and providing a support substantially parallel with the top of the utensil and spaced therefrom for a second utensil having a bottom of smaller diameter than the top of the first utensil.

In testimony whereof I have hereunto affixed my signature.

WALTER J. MANTHEI.